United States Patent
Xiong et al.

(10) Patent No.: US 11,036,102 B1
(45) Date of Patent: Jun. 15, 2021

(54) LIQUID CRYSTAL DISPLAY PANEL

(71) Applicant: WUHAN CHINA STAR OPTOELECTRONICS TECHNOLOGY CO., LTD, Hubei (CN)

(72) Inventors: Xing Xiong, Hubei (CN); Wei Tang, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 11 days.

(21) Appl. No.: 16/649,729

(22) PCT Filed: Dec. 30, 2019

(86) PCT No.: PCT/CN2019/129718
§ 371 (c)(1),
(2) Date: Mar. 23, 2020

(30) Foreign Application Priority Data

Dec. 12, 2019 (CN) .......................... 201911280536.2

(51) Int. Cl.
*G02F 1/1362* (2006.01)
*G02F 1/1368* (2006.01)
*G02F 1/1339* (2006.01)
*G02F 1/1337* (2006.01)

(52) U.S. Cl.
CPC ...... *G02F 1/136209* (2013.01); *G02F 1/1337* (2013.01); *G02F 1/1339* (2013.01); *G02F 1/1368* (2013.01); *G02F 1/136222* (2021.01)

(58) Field of Classification Search
None
See application file for complete search history.

(56) References Cited

U.S. PATENT DOCUMENTS

2017/0075174 A1* 3/2017 Lee .................... G02F 1/133512

FOREIGN PATENT DOCUMENTS

| CN | 109100891 A | 12/2018 |
| CN | 109143648 A | 1/2019 |

* cited by examiner

*Primary Examiner* — James A Dudek
(74) *Attorney, Agent, or Firm* — Mark M. Friedman

(57) ABSTRACT

A liquid crystal display panel includes a blind hole area, which includes a blind hole light transmission region and a blind hole periphery region surrounding the blind hole light transmission region. A first transparent support is disposed on a color filter substrate in the blind hole light transmission region, and the first transparent support is configured to support the color filter substrate and a thin film transistor array substrate in the blind hole light transmission region. A black matrix is disposed on the color filter substrate in the blind hole periphery region, and a plurality of second transparent supports are disposed corresponding to the black matrix. A problem with optical uniformity of a display panel can be resolved by the first transparent support located in the blind hole light transmission region.

14 Claims, 3 Drawing Sheets

LIQUID CRYSTAL DISPLAY PANEL

TECHNICAL FIELD

The present invention relates to the field of display technology, and more particularly, to a liquid crystal display panel which is provided to reduce deformation between a color filter substrate and a thin film transistor array substrate.

BACKGROUND

Development of intelligent terminal screens has so far been able to achieve a full-screen level in which a screen-to-body ratio is greater than 90%. Based on a design of a full-screen structure, cameras, receivers, sensors, etc. need to be installed in display areas of a panel by means of drilling (such as a blind hole). In an existing design, since a liquid crystal layer is retained in a blind hole light transmission region, stress causes the panel to deform. Since lack of support leads to a thinner cell in the blind hole light transmission region, this causes non-uniform display, resulting in a problem with optical uniformity of a display panel. Therefore, it is necessary to provide a liquid crystal display panel to resolve the existing problem.

Technical Problem

An objective of the present invention is to provide a liquid crystal display to improve a problem with optical uniformity of a display panel.

Technical Solution

In order to achieve above objective, a first aspect of the present invention provides a liquid crystal display panel comprising a blind hole area which comprises:

a blind hole light transmission region, a first transparent support disposed on a color filter substrate in the blind hole light transmission region, and the first transparent support configured to support the color filter substrate and a thin film transistor array substrate in the blind hole light transmission region; and a blind hole periphery region surrounding the blind hole light transmission region, a black matrix disposed on the color filter substrate in the blind hole periphery region, and a plurality of second transparent supports disposed corresponding to the black matrix.

Further, a width of the first transparent support located in the blind hole light transmission region is greater than a width of the blind hole light transmission region.

Further, the first transparent support and the plurality of second transparent supports are photo spacers, and a material of the photo spacers is transparent resin.

Further, the thin film transistor array substrate comprises:
a thin-film transistor (TFT) array base;
a gate insulation layer located above the TFT array base;
a dielectric layer located on the gate insulation layer;
a planarization layer located on the dielectric layer; and
a passivation layer located on the planarization layer.

Further, a material of the planarization layer is transparent resin.

Further, in the blind hole light transmission region, the gate insulation layer is provided with a first via, the dielectric layer is provided with a second via, and the planarization layer fills into the first via and the second via.

Further, the passivation layer is provided with a third via in the blind hole light transmission region.

Optionally, a height of the first transparent support located in the blind hole light transmission region is equal to a height of the plurality of second transparent supports located in the blind hole periphery region.

Optionally, a height of the first transparent support located in the blind hole light transmission region is greater than a height of the plurality of second transparent supports located in the blind hole periphery region.

Further, the passivation layer is provided with a via in the blind hole light transmission region.

Optionally, a height of the first transparent support located in the blind hole light transmission region is equal to a height of the plurality of second transparent supports located in the blind hole periphery region.

Optionally, a height of the first transparent support located in the blind hole light transmission region is greater than a height of the plurality of second transparent supports located in the blind hole periphery region.

Further, the color filter substrate comprises:
a color filter base;
the black matrix located on the color filter base;
a color resist layer located on the black matrix;
a protective layer located on the color resist layer; and
an upper alignment layer, located on the protective layer.

Optionally, the first transparent support and the plurality of second transparent supports are disposed on the upper alignment layer.

Optionally, the first transparent support and the plurality of second transparent supports are disposed on the protective layer and are covered by the upper alignment layer.

Further, a material of the protective layer is transparent resin.

A second aspect of the present invention provides an electronic device, comprising the liquid crystal display panel as mentioned above.

Beneficial Effect

A liquid crystal display panel designed according to the present invention may resolve a problem of nonuniform display caused by deformation between a color filter substrate and a thin film transistor array substrate in a blind hole light transmission region by providing a first transparent support.

DETAILED DESCRIPTION OF PREFERRED EMBODIMENTS

To make the objectives, technical schemes, and effects of the present invention clearer and more specific, the present invention is described in further detail below with reference to the appending drawings. It should be understood that the specific embodiments described herein are merely for explaining the present invention, the term "embodiment" used in the context means an example, instance, or illustration, it is not intended to limit the present invention.

The present invention provides a liquid crystal display (LCD) panel, which has effects of reducing liquid crystals in a blind hole light transmission region and improving deformation between substrates in the blind hole light transmission region, so that electronic devices (such as cameras) installed in the blind hole light transmission region is able to function normally.

Figure 1:
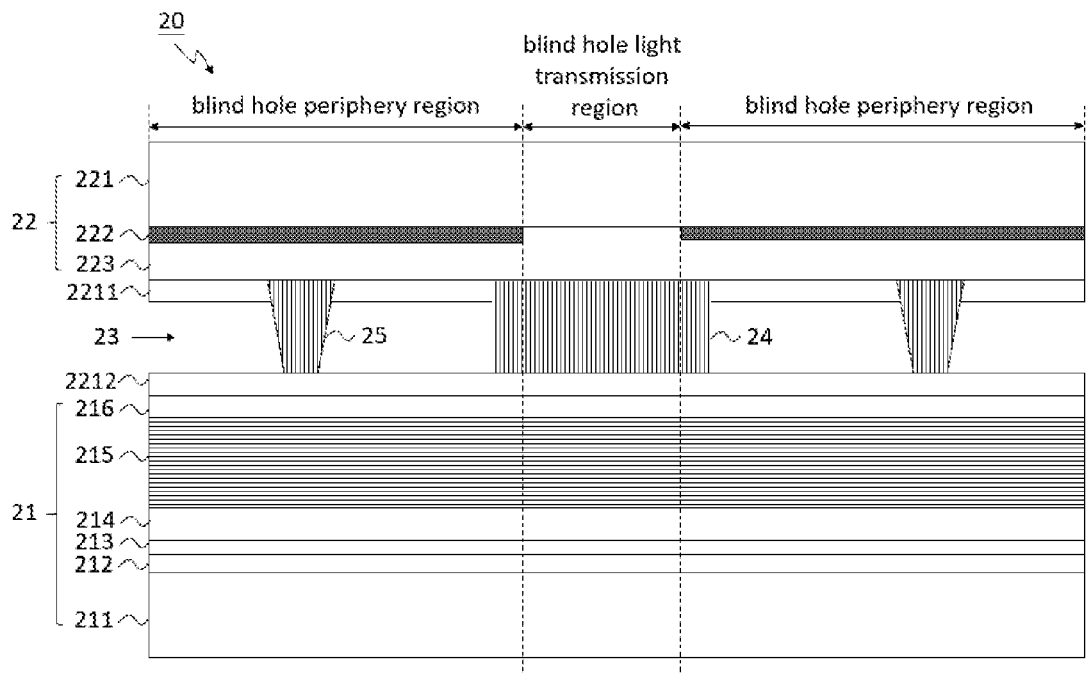
FIG. 1 is a schematic diagram showing a liquid crystal display panel according to a first embodiment of the present invention.

Referring to FIG. 1, which is a schematic diagram showing a liquid crystal display panel 20 according to a first embodiment of the present invention. The first embodiment of the present invention provides the liquid crystal display panel 20, which includes a color filter substrate 22 and a thin film transistor array substrate 21, which are disposed opposite to each other, and a liquid crystal layer 23 disposed between the color filter substrate 22 and the thin film transistor array substrate 21, wherein the liquid crystal display panel 20 includes a blind hole area, which is provided with a blind hole light transmission region and a blind hole periphery region which surrounds the blind hole light transmission region and is shielded by a black matrix (BM) 222. The black matrix 222 is disposed on the color filter substrate 22. Specifically, the color filter substrate 22 includes a color filter base 221 and the black matrix 222, a color resist layer (not shown), a protective layer (or an overcoat layer, OC) 223 used to cover and protect the color resist layer, and an upper alignment layer 2211, which are disposed sequentially on the color filter base 221. Furthermore, the thin film transistor array substrate 21 includes a thin-film transistor (TFT) array base 211 and a buffer layer 212, a gate insulation layer 213, a dielectric layer 214, a planarization layer 215, a passivation layer 216, and a lower alignment layer 2212, which are disposed sequentially on the TFT array base 211, wherein the black matrix 222 is provided with an open hole, an area of the open hole is the blind hole light transmission region, and a non-opening area of the black matrix 222 is a non-displaying blind hole periphery region due to the shielding of the black matrix 222. Further, the blind hole light transmission region and the blind hole periphery region corresponding to the color filter substrate 22 are disposed corresponding to the thin film transistor array substrate 21, that is, the blind hole light transmission region corresponding to the color filter substrate 22 overlaps with the blind hole light transmission region corresponding to the thin film transistor array substrate 21, and the blind hole periphery region corresponding to the color filter substrate 22 also overlaps with the blind hole periphery region corresponding to the thin film transistor array substrate 21.

In the present embodiment, transparent supports prepared by an LCD standard process are used to prevent an interval between the color filter substrate 22 and the thin film transistor array substrate 21 from being too close and affecting functions of electronic devices installed in the blind hole light transmission region. Therefore, a plurality of second transparent supports 25 are formed between the color filter substrate 22 and the thin film transistor array substrate 21 by development and etching processes in the blind hole periphery region, and the plurality of second transparent supports are configured to support the color filter substrate 22 and the thin film transistor array substrate 21. However, the interval between the color filter substrate 22 and the thin film transistor array substrate 21 in the blind hole light transmission region is still too close by means of this manner. Therefore, the present invention further provides a first transparent support 24 formed between the color filter substrate 22 and the thin film transistor array substrate 21 in the blind hole light transmission region, which is used to strengthen support in the blind hole light transmission region and reduce deformation of the color filter substrate 22 and the thin film transistor array substrate 21. Specifically, the plurality of second transparent supports 25 located in the blind hole periphery region and the first transparent support 24 located in the blind hole light transmission region are formed on the upper alignment layer 2211 by development and etching processes, and are in contact with the lower alignment layer 2212 of the thin film transistor array substrate 21. In the first embodiment of the present invention, the first transparent support 24 located in the blind hole light transmission region is in close contact with the lower alignment layer 2212, and the plurality of second transparent supports 25 located in the blind hole periphery region are also in close contact with the lower alignment layer 2212. For the sake of convenience, the plurality of second transparent supports located in the blind hole periphery region are all in close contact with the lower alignment layer in the embodiments described below, and no further elaboration on details will be made.

In the following paragraphs, the first transparent support and the second transparent supports may be photo spacers. For the sake of convenience, the first photo spacer and the second photo spacers are named exemplarily below.

In the present embodiment, a width of the first photo spacer 24 located in the blind hole light transmission region is slightly greater than a width of the blind hole light transmission region, and the first photo spacer 24 partially overlaps with the blind hole periphery region surrounding the first photo spacer 24, hence making good use of space of the blind hole periphery region for better support.

In another embodiment, the photo spacers may be formed on the protective layer 223 and be covered by the upper alignment layer 2211, that is, the photo spacers are formed on the protective layer 223 by development and etching processes after the protective layer 223 is formed. Then, the photo spacers are covered by the upper alignment layer 2211, so that the upper alignment layer 2211 formed on the photo spacers is in direct contact with the lower alignment layer 2212, wherein the photo spacers include the plurality of second photo spacers 25 located in the blind hole periphery region and the first photo spacer 24 located in the blind hole light transmission region. It can be understood that, as long as the first photo spacer 24 is formed in the blind hole light transmission region, it is within the protection scope of the present invention.

In the present embodiment, since function quality of electronic devices is substantially related to a transmission rate of liquid crystals and film layers located in the blind hole light transmission region, hence, another beneficial effect is that the first photo spacer 24 located in the blind hole light transmission region may further and maximally squeeze liquid crystals out of the blind hole light transmission region to increase light transmission rate. The first embodiment of the present invention provides an embodiment in which the first photo spacer 24 is in close contact with the lower alignment layer 2212, and all liquid crystals located in the blind hole light transmission region can be squeezed out to minimize influence of liquid crystals on light transmission rate.

In the present embodiment, the protective layer 223, the first photo spacer 24, and the planarization layer 215 are transparent organic layers or transparent resin, so that better light transmission rate can be obtained. That is, when external light passes through the blind hole light transmission region, it passes through the protective layer 223 with high light transmission rate, the first photo spacer 24, and the planarization layer 215 and reaches an electronic device (such as a camera). Therefore, how to increase the light transmission rate between the film layers becomes another key. The present invention provides a plurality of embodiments for improving the light transmission rate in the blind hole light transmission region, which are described in detail in subsequent embodiments.

Figure 2:
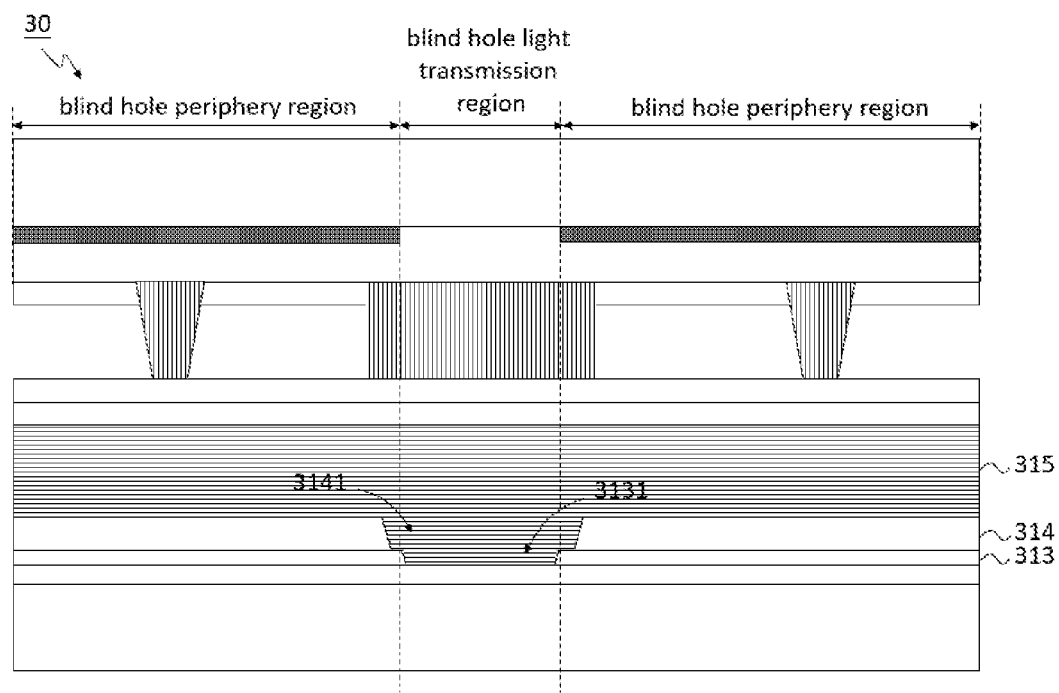
FIG. 2 is a schematic diagram showing a liquid crystal display panel according to a second embodiment of the present invention.

Refer to FIG. 2, which is a schematic diagram showing a liquid crystal display panel 30 according to a second embodiment of the present invention. To further improve the light transmission rate in the blind hole light transmission region, the second embodiment of the present invention further makes improvements on the first embodiment (shown in FIG. 1). The difference is that the gate insulation layer 313 is provided with a first via 3131 and the dielectric layer 314 is provided with a second via 3141 in the blind hole light transmission region. When the planarization layer 315 is formed, the planarization layer 315 fills the first via 3131 and the second via 3141, that is, the planarization layer 315 with better light transmission rate is used to replace the gate insulation layer 313 and the dielectric layer 314 in the blind hole light transmission region according to the second embodiment of the present invention, in a bid to obtain better light transmission rate.

Figure 3:
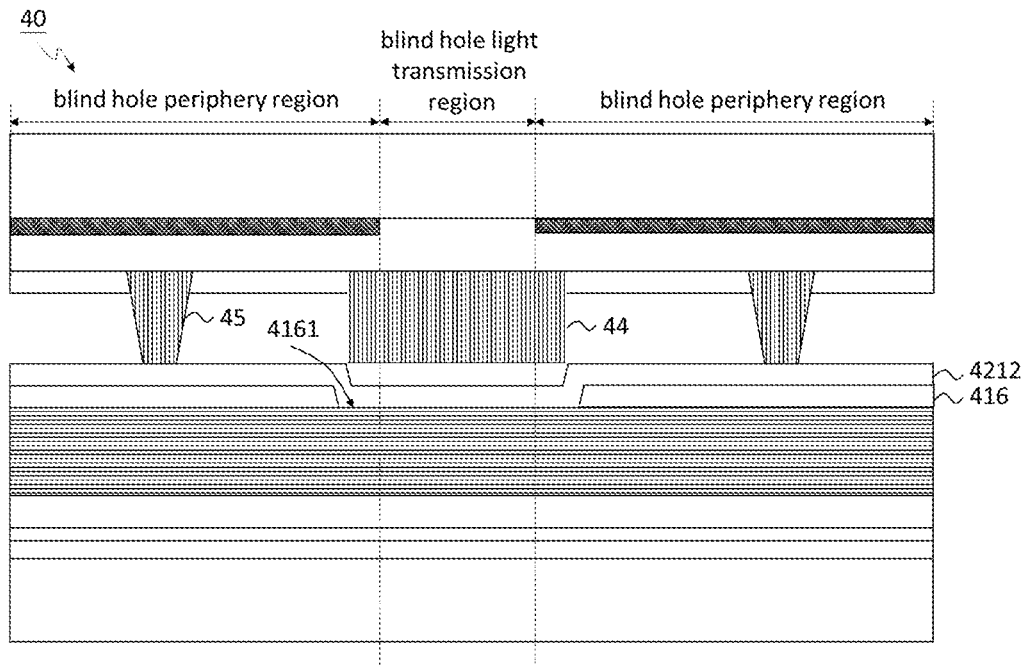
FIG. 3 is a schematic diagram showing a liquid crystal display panel according to a third embodiment of the present invention.
Figure 4:
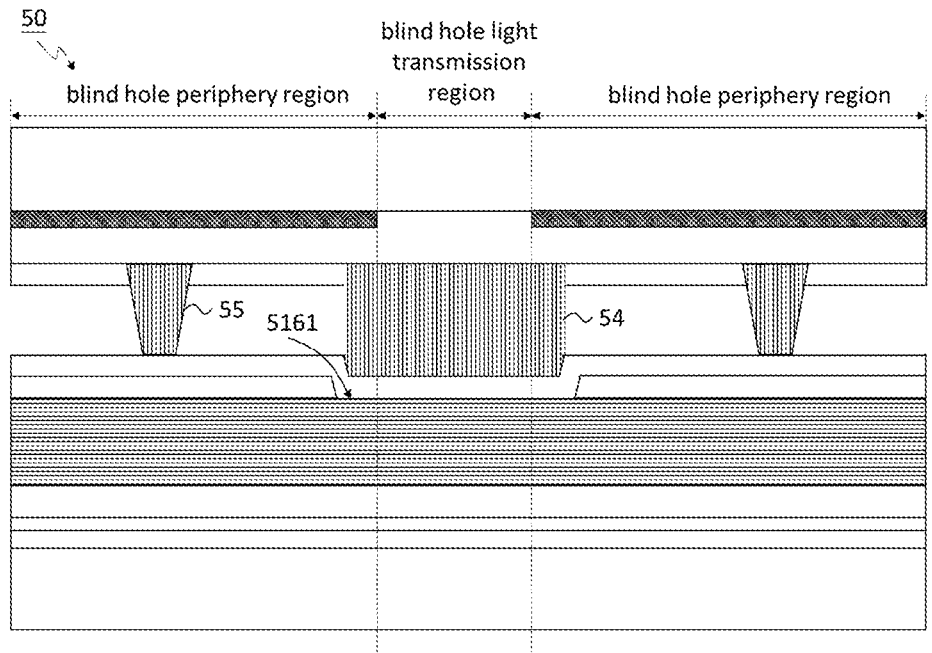
FIG. 4 is a schematic diagram showing a liquid crystal display panel according to a fourth embodiment of the present invention.

Referring to FIG. 3 and FIG. 4, FIG. 3 is a schematic diagram showing a liquid crystal display panel 40 according to a third embodiment of the present invention, FIG. 4 is a schematic diagram showing a liquid crystal display panel 50 according to a fourth embodiment of the present invention. Compared with the first embodiment of the present invention (as shown in FIG. 1), the difference is that the passivation layer 416 is provided with a third via 4161, and the third via 4161 is covered by the lower alignment layer 4212. In the present embodiment, the passivation layer 416 with lower light transmission rate is hollowed out to increase light transmission rate. Moreover, a height of the first photo spacer 44 located in the blind hole light transmission region may be equal to a height of the plurality of second photo spacers 45 located in the blind hole periphery region. Most liquid crystals located in the blind hole light transmission region can be squeezed out by the first photo spacer 44 located in the blind hole light transmission region, that is, there may still be some liquid crystals remaining between the lower alignment layer 4212 and the first photo spacer 44, as shown in FIG. 3. Further, the first photo spacer 54 located in the blind hole light transmission region may be formed to have a height and width corresponding to the third via 5161 according to requirements, that is, the height of the first photo spacer 54 located in the blind hole light transmission region may be greater than the height of the plurality of second photo spacers 55 located in the blind hole periphery region, so that more liquid crystals can be squeezed out of the blind hole light transmission region, as shown in FIG. 4.

Figure 5:
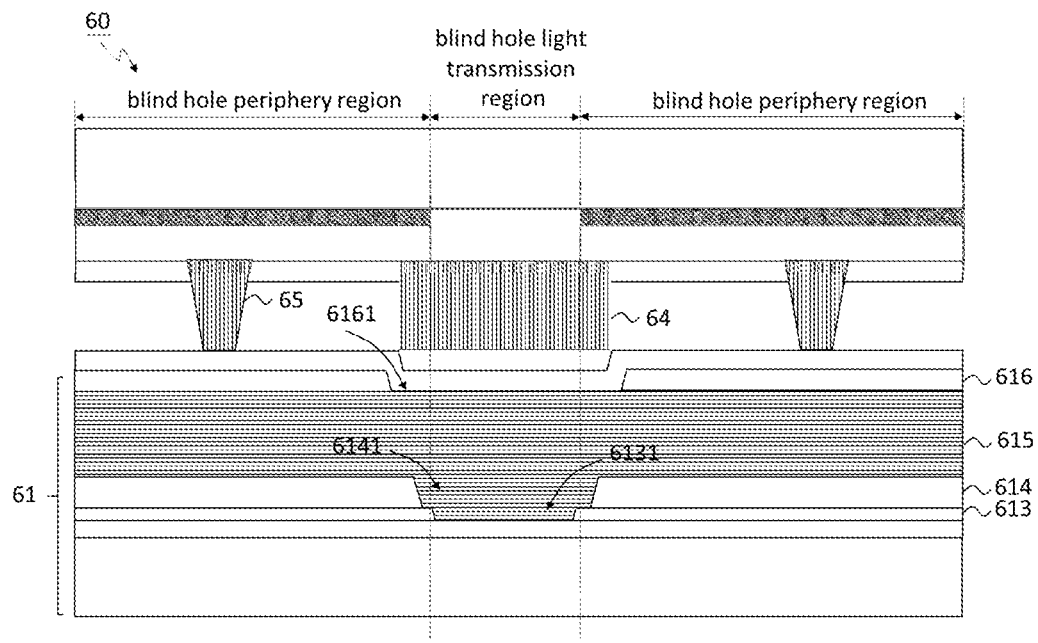
FIG. 5 is a schematic diagram showing a liquid crystal display panel according to a fifth embodiment of the present invention.
Figure 6:
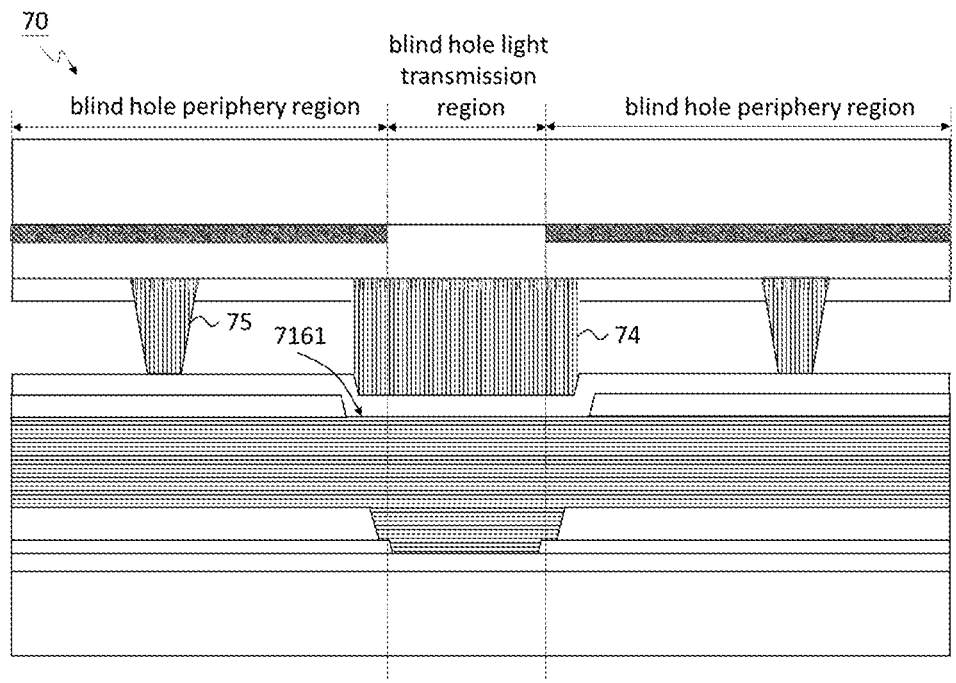
FIG. 6 is a schematic diagram showing a liquid crystal display panel according to a sixth embodiment of the present invention.

Referring to FIG. 5 and FIG. 6, FIG. 5 is a schematic diagram showing a liquid crystal display panel 60 according to a fifth embodiment of the present invention, FIG. 6 is a schematic diagram showing a liquid crystal display panel 70 according to a sixth embodiment of the present invention. They combine concepts of the first to fourth embodiments of the present invention. The gate insulation layer 613 is provided with a fourth via 6131, a dielectric layer 614 is provided with a fifth via 6141, and the passivation layer 616 is provided with a sixth via 6161 in the blind hole light transmission region of the thin film transistor array substrate 61. That is, the planarization layer 615 with better light transmission rate is used to replace the gate insulation layer 613 and the dielectric layer 614 which are located in the blind hole light transmission region, and the passivation layer 616 with lower light transmission rate is hollowed out to maximally increase the light transmission rate in the blind hole light transmission region. Moreover, the height of the first photo spacers 64 in the blind hole light transmission may be equal to the height of the plurality of second photo spacers 65 in the blind hole periphery region, and the first photo spacer 64 in the blind hole light transmission region may squeeze out most liquid crystals located in the blind hole light transmission region. That is, there may still be some liquid crystals remaining in the blind hole light transmission region, as shown in FIG. 5. Further, the first photo spacer 74 located in the blind hole light transmission region may be formed to have a height and width corresponding to the third via 7161 according to requirements, that is, the height of the first photo spacer 74 located in the blind hole light transmission region may be greater than the height of the plurality of second photo spacers 75 located in the blind hole periphery region, so that more liquid crystals can be squeezed out of the blind hole light transmission region, as shown in FIG. 6.

In the present invention, the blind hole light transmission region is used to allow external light to pass through the blind hole light transmission region to reach an electronic device, such as a camera. It can be understood that the present invention does not limit the types of the electronic device. As long as the electronic device has a structure and functions mentioned in the embodiments above, it is within the protection scope of the present invention.

The above description is only a specific embodiment of the present application. It should be noted that, for persons skilled in this art, various modifications and alterations can be made without departing from the principles of the present application, and it should be considered as a protection scope of the present application.

What is claimed is:

1. A liquid crystal display panel comprising a blind hole area, wherein the blind hole area comprises:
    a blind hole light transmission region, a first transparent support disposed on a color filter substrate in the blind hole light transmission region, and the first transparent support configured to support the color filter substrate and a thin film transistor array substrate in the blind hole light transmission region; and
    a blind hole periphery region surrounding the blind hole light transmission region, a black matrix disposed on the color filter substrate in the blind hole periphery region, and a plurality of second transparent supports disposed corresponding to the black matrix,
    wherein the thin film transistor array substrate comprises:
    a thin-film transistor (TFT) array base;
    a gate insulation layer located above the TFT array base;
    a dielectric layer located on the gate insulation layer;
    a planarization layer located on the dielectric layer; and
    a passivation layer located on the planarization layer;

wherein in the blind hole light transmission region, the gate insulation layer is provided with a first via, the dielectric layer is provided with a second via, and the planarization layer fills the first via and the second via; wherein the passivation layer is provided with a third via in the blind hole light transmission region.

2. The liquid crystal display panel as claimed in claim 1, wherein a width of the first transparent support located in the blind hole light transmission region is greater than a width of the blind hole light transmission region.

3. The liquid crystal display panel as claimed in claim 1, wherein the first transparent support and the plurality of second transparent supports are photo spacers, and a material of the photo spacers is transparent resin.

4. The liquid crystal display panel as claimed in claim 1, wherein a material of the planarization layer is transparent resin.

5. The liquid crystal display panel as claimed in claim 1, wherein a height of the first transparent support located in the blind hole light transmission region is equal to a height of the plurality of second transparent supports located in the blind hole periphery region.

6. The liquid crystal display panel as claimed in claim 1, wherein a height of the first transparent support located in the blind hole light transmission region is greater than a height of the plurality of second transparent supports located in the blind hole periphery region.

7. The liquid crystal display panel as claimed in claim 1, wherein the passivation layer is provided with a via in the blind hole light transmission region.

8. The liquid crystal display panel as claimed in claim 7, wherein a height of the first transparent support located in the blind hole light transmission region is equal to a height of the plurality of second transparent supports located in the blind hole periphery region.

9. The liquid crystal display panel as claimed in claim 7, wherein a height of the first transparent support located in the blind hole light transmission region is greater than a height of the plurality of second transparent supports located in the blind hole periphery region.

10. The liquid crystal display panel as claimed in claim 1, wherein the color filter substrate comprises:
a color filter base;
the black matrix located on the color filter base;
a color resist layer located on the black matrix;
a protective layer located on the color resist layer; and
an upper alignment layer located on the protective layer.

11. The liquid crystal display panel as claimed in claim 10, wherein the first transparent support and the plurality of second transparent supports are disposed on the upper alignment layer.

12. The liquid crystal display panel as claimed in claim 10, wherein the first transparent support and the plurality of second transparent supports are disposed on the protective layer and are covered by the upper alignment layer.

13. The liquid crystal display panel as claimed in claim 10, wherein a material of the protective layer is transparent resin.

14. An electronic device, comprising the liquid crystal display panel as claimed in claim 1.

* * * * *